United States Patent [19]
Brewer et al.

[11] Patent Number: 5,880,722
[45] Date of Patent: Mar. 9, 1999

[54] VIDEO CURSOR WITH ZOOM IN THE USER INTERFACE OF A VIDEO EDITOR

[75] Inventors: Eric T. Brewer, Saratoga, Calif.;
Clifford A. Grabhorn, Atlanta, Ga.;
Thomas S. Gilley, Lamoine, Me.;
Baldo A. Faieta, San Francisco, Calif.

[73] Assignee: FutureTel, Inc., Sunnyvale, Calif.

[21] Appl. No.: 968,026

[22] Filed: Nov. 12, 1997

[51] Int. Cl.⁶ .................................................. G06F 15/00
[52] U.S. Cl. ........................ 345/328; 345/145; 345/973; 345/974
[58] Field of Search ................................. 345/326, 328, 345/340, 341, 348, 349, 973, 974, 145

Primary Examiner—Huynh Ba
Attorney, Agent, or Firm—Beyer & Weaver, LLP

[57] ABSTRACT

In a digital computer system running a windows operating system and a video editor where the video data is stored in the memory and clips of the video data consisting of sequences of video frames are represented by blocks in a workspace on the video display. A video cursor is provided to scroll through the frames. The disclosure describes a convenient method of allowing the user to control the scale of the horizontal axis and thus the number of video frames that may be symbolically viewed on the workspace window without panning. The method includes the following steps: First, determining if the video cursor is being intentionally moved vertically by a user. Next, determine the vertical distance that the video cursor is moved from a reference point. Finally, adjust the number of video frames that may be represented on the workspace in relationship to the vertical movement of the video cursor.

1 Claim, 10 Drawing Sheets

VIDEO CURSOR WITH ZOOM IN THE USER INTERFACE OF A VIDEO EDITOR

CROSS-REFERENCE TO RELATED APPLICATIONS

Please refer to co-pending application Ser. No. 08,968, 550 filed on Nov. 12, 1997 by Brewer, et al. entitled MAGNETIZED EDIT BLOCKS IN USER INTERFACE OF A VIDEO EDITOR.

BACKGROUND OF THE INVENTION

1. Field of the Invention

The subject invention relates to user interfaces for video editors. More particularly, the invention relates to a video cursor that provides substantial convenience to the user by providing the ability to scroll through a sequence of frames of any length with a single scrolling element.

2. Description of the Prior Art

A video consists of electronically stored images called frames that are played back on a video display terminal such as a CRT. Videos may be in either an analog or digital format. However, the digital computer has proven to be very useful in editing video. Thus, many analog videos are converted to digital for editing. The present invention relates to the editing of digital videos. A digital video is a sequence of image frames that are stored in the memory a digital computer and replayed in frame sequence at a high frame rate, called video rate, to provide full motion images. Because computers have limited memory and because videos consume large amounts of memory, most videos are stored in a compressed format. The compression format standard currently in wide use is called Motion Picture Experts Group ("MPEG") which is described in detail in the following documents which are hereby incorporated by reference: (1) a document entitled Generic Coding of Moving Pictures and Associated Audio Information; Video, ISO/IEC 13818-2; (2) a document entitled Coding of Moving Pictures and Associated Audio for Digital Storage Media at up to about 1.5 MBit/sec (Part 3 Audio) 3-11171 rev 1 (1995); and (3) a document entitled Generic Coding of Moving Pictures and Associated Audio Information ISO/IEC 13818-3. All above-referenced MPEG standard documents may be obtained from ISO/IEC Case Postale 56, CH 1211, Geneva 20, Switzerland.

Video elements consist of digital files containing sound, video clips, still pictures, overlays and transitions. Video editors are in general used to arrange and modify these elements. In the context of the present invention, video clips and sound are illustrated as blocks on the user interface. The user may rearrange the blocks, add overlays and transitions. In this way, the user forms a long track of frames which constitute the edited video. Because video clips may be any length, it is desirable to have a convenient and effective interface for scrolling through clips as represented on the video display as blocks.

SUMMARY OF THE INVENTION

The present invention is a method for allowing the user of a video editor running on a computer system having a CPU, memory and a video display. The video data is stored in the memory and clips of the video data consisting of sequences of video frames are represented by blocks in a workspace on the video display. A video cursor is provided to scroll through the frames. The method includes the following steps: First, determine if the video cursor is being intentionally moved vertically by a user. Next, determine the vertical distance that the video cursor is moved from a reference point. Finally, adjust the number of video frames that may be represented on the workspace in relationship to the vertical movement of the video cursor.

BRIEF DESCRIPTION OF THE DRAWING

The invention will now be described in conjunction with the Drawing wherein.

DESCRIPTION OF THE PREFERRED EMBODIMENT

The present invention will be described in connection with a conventional digital computer having a CPU, memory and a video display and using a windows based operating system where a mouse moves a mouse cursor on the video display and various elements on the display may be dragged from one position to another on the video display by moving the mouse cursor to the element to be moved, depressing a button on the mouse and moving the mouse cursor to a new location on the video display.

Figure 1:
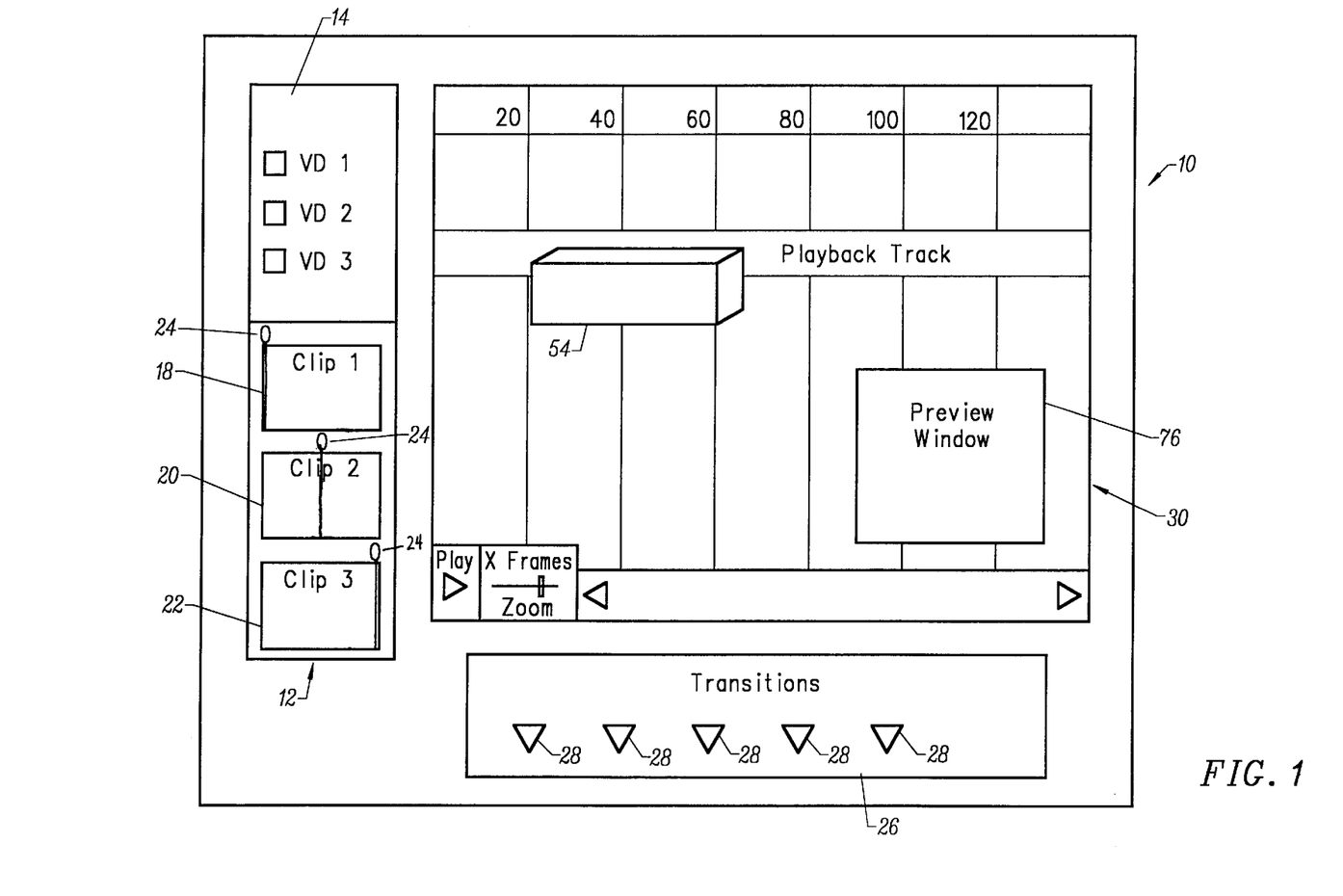
FIG. 1 is a view of the user interface elements according to the present invention.

FIG. 1 is a view of the user interface elements with which the present invention operates. Referring now to FIG. 1, reference numeral 10 designates the entire user interface which appears on a conventional video display terminal. User interface 10 includes a thumbnail clips window 12 which provides information on the available video element files such as sound files, video clip files and picture files and is a source of such elements to be dragged for further editing. Thumbnail clips window consists of a directories window 14 containing information on the video directories in use and a thumbnail views window 16 which provides views indicative of the contents of the video element files within the current selected directory. In this example, 3 thumbnail views 18, 20 and 22 are illustrated. Each thumbnail view shows a frame of the associated video element file. The actual frame shown is dependent on the position of a thumbnail cursor 24. If the video clip has sound, then a sound icon, not shown, appears on the corners of the thumbnail view. The user can select which frame in a thumbnail is shown by dragging thumbnail cursor 24 horizontally in either direction. The left-most position corresponds to the beginning of the clip and the right-most position corresponds to the end of the clip.

User interface 10 also contains transitions window 26 which is a palette of available transitions. A transition is represented by a triangular block. In this case, there are 5 different transitions 28.

User interface 10 also contains a workspace window 30. Workspace window 30 is the area of the user interface where video editing takes place. Material to be edited is brought to the workspace window 30 by dragging thumbnail views from thumbnail window 16 to workspace window 30. When a thumbnail crosses into workspace window 30, it becomes a block. Blocks represent segments of video elements and are constructed as best shown with reference to FIGS. 2(a) and 2(b).

Figure 2A:
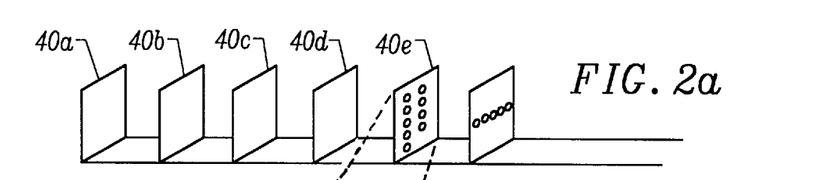
FIGS. 2(a)–2(c) are a perspective illustration of how three dimensional tomographic blocks representing video clips are made.
Figure 2B:
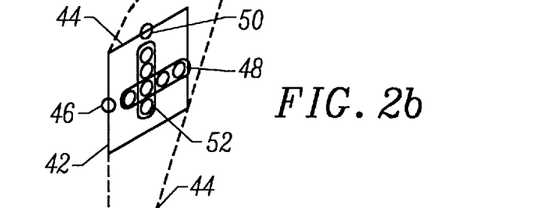
Figure 2C:
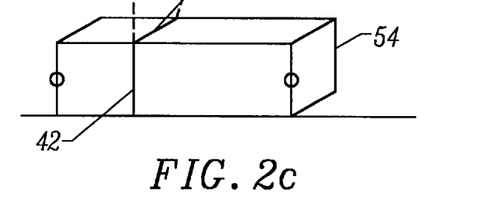

FIG. 2 is a schematic view of video frames stacked vertically. Referring now to FIG. 2, video frames 40 (a)–(e) are stacked in the order in which they are viewed. Each frame is made up of rows and columns of picture elements called pixels. In order to form a block, each independent frame is converted to a vertical line 42 and a diagonal line 44. Each pixel on vertical line 42 is a composite of all pixels with which it aligned horizontally and each pixel on diagonal line 44 is a composite of all pixels with which it is aligned vertically as illustrated in FIG. 2(b). For example, in frame 40(e) of FIG. 2(b), pixel 46 is a composite of the column of pixels shown and in frame 40(e), pixel 50 is a composite of row of pixels 52. FIG. 2(c) shows that in block 54, each independent frame is a single vertical line 42 and a diagonal line 44 made up of composite pixels. The composite may be a function of color and grey scale and may be the mean or medial or the brightest.

Figure 3:
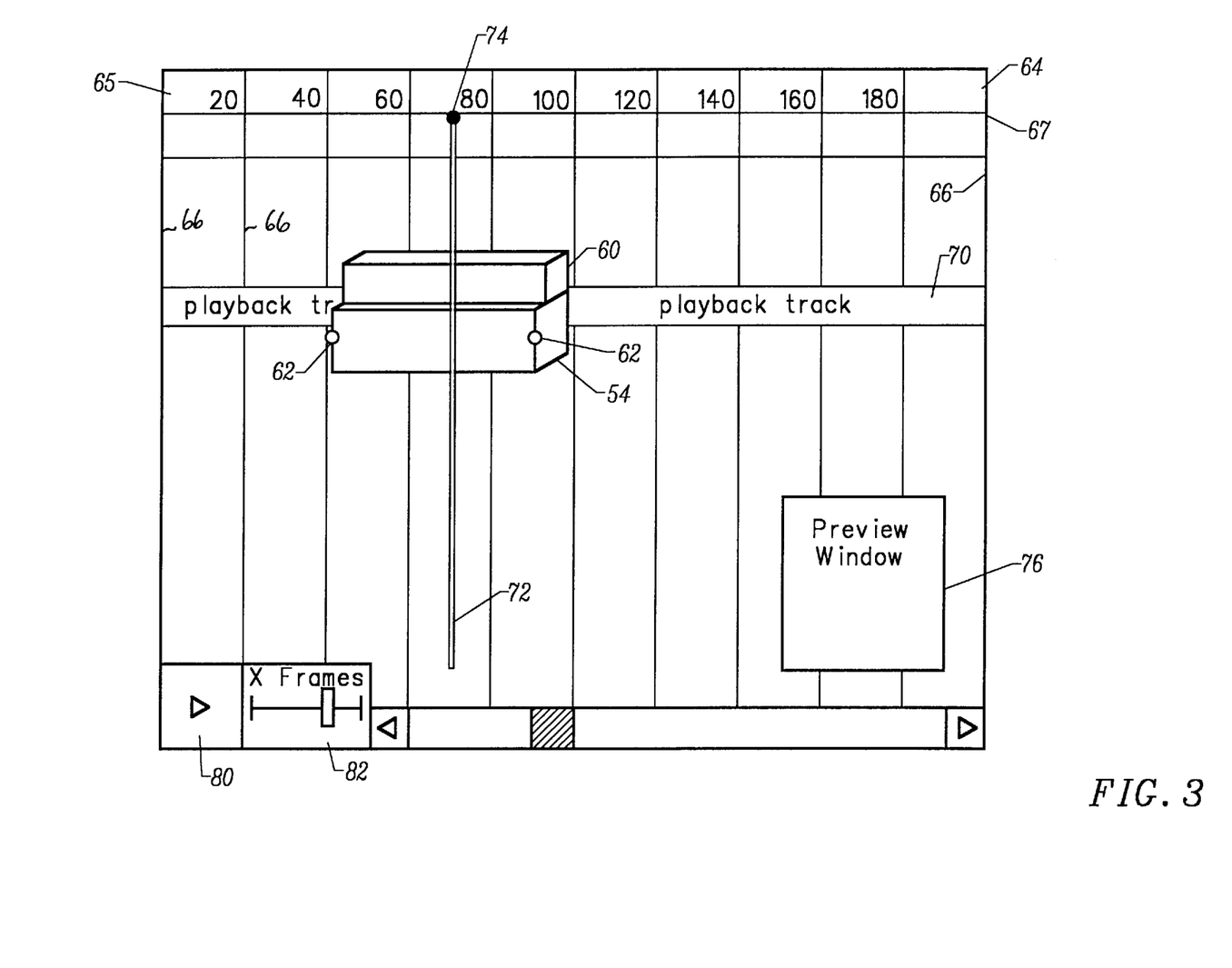
FIG. 3 is a detailed view of workspace window.

FIG. 3 is a detailed view of workspace window 30. Blocks in workspace window 30 behave as solid objects in that they can touch other blocks but cannot overlap or blend with other blocks. Blocks can be copied and pasted within the workspace window 30. When a new video element is dragged into workspace window 30, it becomes a block. If the video element is a video clip, then a video block appears in workspace window 30. For example, thumbnail 18 can be dragged into workspace window 30 and there becomes block 54 which represents a segment of a video clip that initially does not exceed 2 seconds in length. Once a block is in workspace window 30, the user can reedit that block. If the video clip represented by the thumbnail view is longer than 2 seconds, the portion of the segment that is dragged into window is centered around the current position of thumbnail cursor 24. If the video clip has an associated sound track, a sound block 60 also appears in workspace window 30 attached to the video block. At the right and left end of each block there is a ball 62 that serves as a handle to reedit the blocks. That is, balls 62 point to frames in memory. Moving either of balls 62 changes their respective pointers to a new frame in memory. In this way, the size of blocks may be altered.

Workspace window 30 includes a timing-ruler 64 which contains timing reference marks 66 consisting of vertical bars that extend from top to bottom of workspace window 30. Timing ruler starts at its origin 65 at the far left and ends the horizontal limit.

Workspace window 30 also contains a horizontal stripe, 70 called a playback track and a video cursor consisting of a vertical shaft 72 and a knob 74. Workspace window 30 contains a preview window 76 which shows a single frame. Blocks that are on the playback track such as block 54 are played in preview window 76. The location of video cursor shaft 72 determines which frame in block 54 is shown in playback window 76. As the video cursor is moved along block 54 in the horizontal direction, it passes across successive frames in block 54 and as it passes over a frame, that frame appears in playback window 76.

Preview window 76 also shows the edited video while being played at video rates. The preview window is connected to the window that the user is currently using. If the user is previewing thumbnails, in a Thumbnail window, then it is associated with that window, If on the other hand the user is editing in workspace window 30, then it is connected to workspace window 30. Workspace window 30 also contains a start button 80 on which the user clicks to start a play of the edited video and a zoom scale 82, which shows the level of zoom in workspace window 30.

The horizontal-axis in the workspace window is a mapping of time to distance. Timing reference marks indicate the number of frames per unit distance along the horizontal axis—that is the number of frames per horizontal pixel.

Because the completed product coming from the video editor is a video that may play for several minutes, the aggregate string of block along playback track 70 may be very long. Therefore it is very useful to have a zoom feature that allows the user to change the scale of the horizontal axis—that is the number of frames per pixel. Accordingly a zoom feature is provided that allows the user to vary the horizontal scale from a minimum of one frame per pixel to an arbitrarily large number of frames per pixel.

Figure 4:
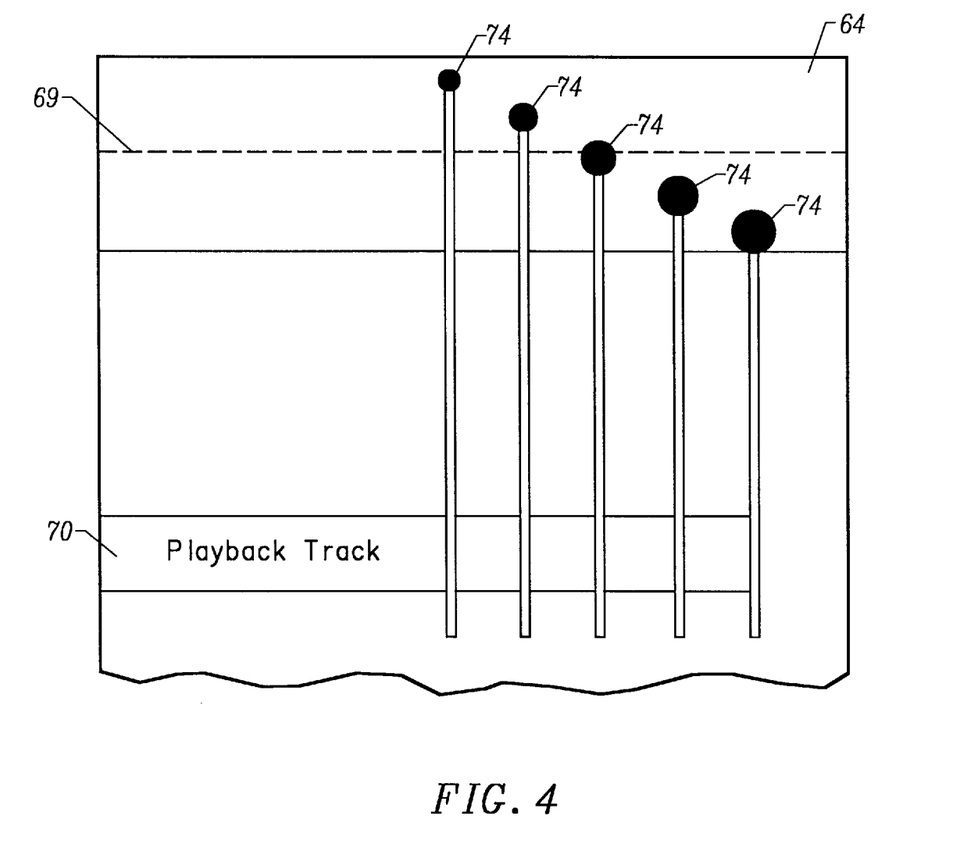
FIG. 4 is a view of the timing ruler illustrating the use of the video cursor to control zoom factor.

The problem then presented is how can the user best take advantage of the zoom feature of the video editor. According to the present invention this is accomplished in a very efficient and useful manner as can best be understood with reference to FIGS. 4 and 5. FIG. 4 is a view of timing ruler 64 with multiple video cursors thereon. According to the present invention, the zoom factor is controlled by the user by manipulating video cursor knob 74 in a vertical direction. As will be recalled, if the video cursor is moved in the horizontal direction, it causes scrolling through any particular video clip through which it passes and which is on playback track 70. Horizontal movement of video the cursor however does not in any way affect the horizontal scale. According to the present invention, zoom scale is modified when the user drags knob 74 either up or down in the vertical direction only. FIG. 4 shows how the video cursor would appear as a user moved cursor shaft 72 and knob 74 to both scroll and change the zoom factor. The four cursors are shown spaced in the horizontal direction to more clearly illustrate the principle; however there is only one cursor shown in workspace window 30 ever, and the cursor need not be moved in the horizontal direction to cause movement of knob 74 in the vertical direction.

When knob 74 is not engaged by the user, it sits on centerline 69 in timing ruler 64. At this point, the zoom factor, F, is at its default, D, value which may be adjustable. The user engages the zoom by moving the mouse cursor to knob 74, holding down the mouse button and dragging knob 74 in the vertical direction—either up or down away for center line 69. If knob 74 is dragged upward, the zoom factor is decreased so that more frame are on workspace window 30. If knob 74 is dragged down, the zoom factor is increased so that fewer frames appear on workspace window 30. When the mouse button is released, it springs back to centerline 69 and the zoom factor, F, changes accordingly.

The zoom factor affects the timing reference marks of timing ruler 64. The distance between timing marks is determined by a user adjustable factor, K, times the zoom factor, F. Typically K is about 20.

Still referring to FIG. 4, and according to another aspect of the invention, the size of knob 74 is changed to correspond to changes in the zoom factor. As can be seen, knob 74 is smallest when it is nearest to timing ruler 64 and becomes larger as it approaches playback track 70. Thus, knob 74 is small when the zoom factor is small and large when it is large.

Figure 5:
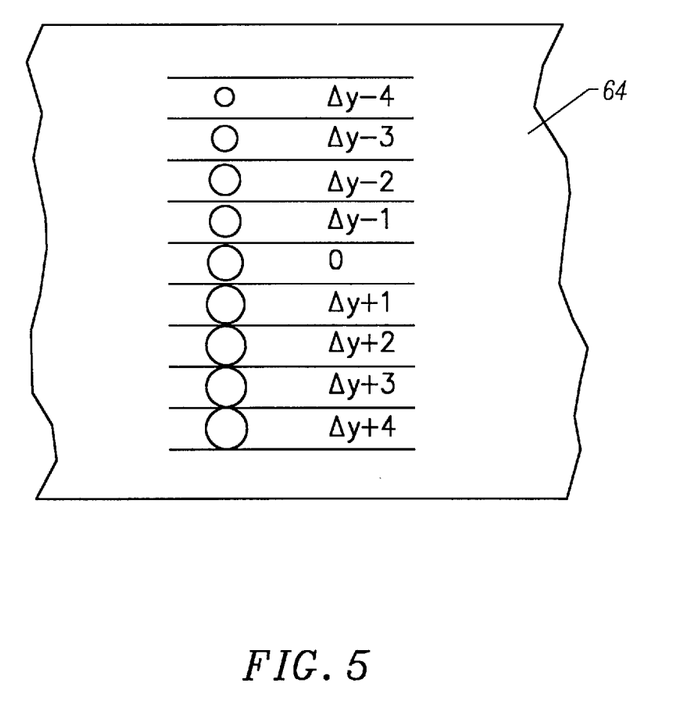
FIG. 5 is a schematic illustration showing example locations of video cursor knobs on the vertical axis of a workspace window.

FIG. 5 is a schematic illustration showing example locations of video cursor knobs 74 on the vertical axis of timing ruler 64. Referring now to FIG. 5, the vertical distance between playback track 70 and timing ruler 64 is broken up into increments, Δy. When cursor knob 74 is moved by a user, it will end up in a particular Δy. Since this is true, a particular zoom factor may be associated with each Δy. Table 1 below provides an example:

TABLE 1

| Δy | Zoom Factor |
|---|---|
| −4 | −16 |
| −3 | −8 |
| −2 | −4 |
| −1 | −2 |
| Center | Default |
| +1 | +2 |
| +2 | +4 |
| +3 | +8 |
| +4 | +16 |

As can be seen, the zoom factors, F, increases exponentially from its smallest zoom to its largest zoom. This is to allow for large zooms which cover a large video clip at one end and to provide high precision at the other end. Other arrangements are of course possible, and of course the number of Δy's may be varied.

Figure 6:
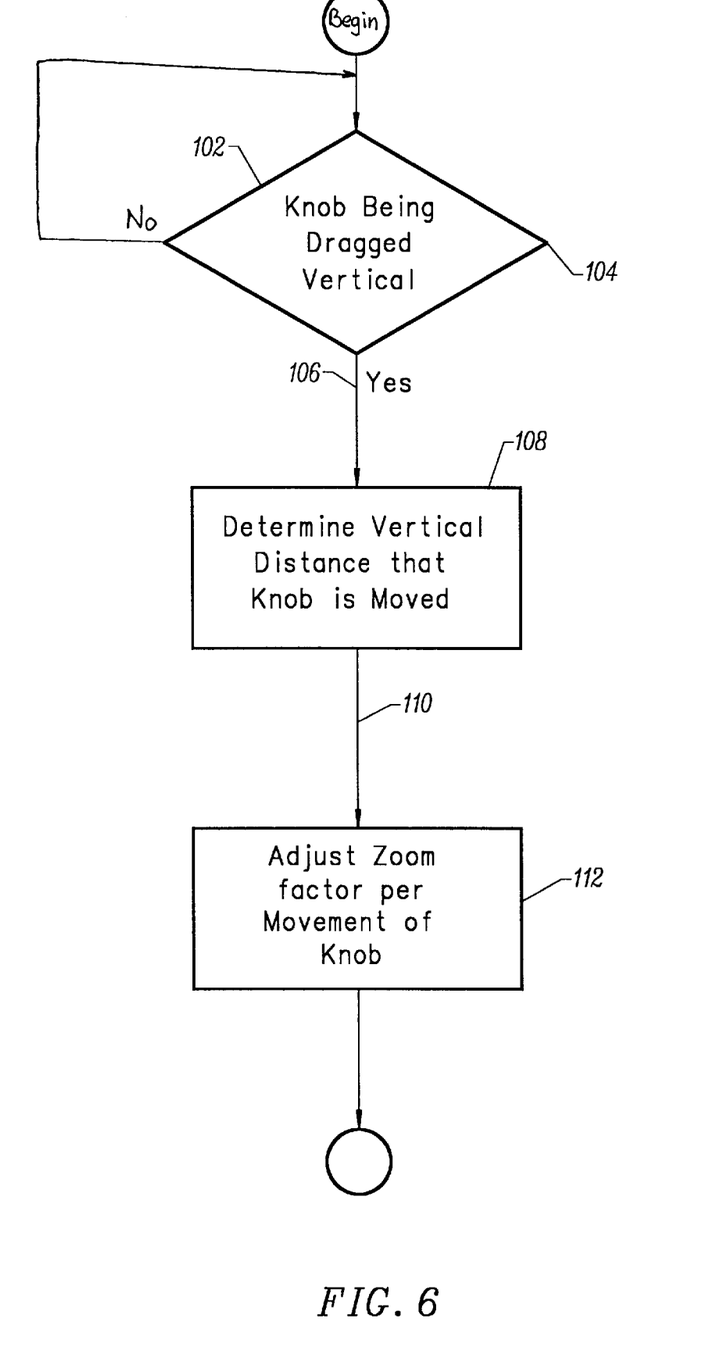
FIG. 6 is a high level flow chart of the present invention.

FIG. 6 is a high level flow chart of the method of the present invention. Referring now to FIG. 6, the first step in the method is to determine if the movement of the knob 74 of the video cursor has a vertical component in it. This step is illustrated by the decision block 102. If the decision is no follow process path 104 back to the beginning of the method. If the decision is yes, follow process path 106 to processing block 108 where the vertical distance moved by knob 74 is determined. From process block 108, follow process path 110 to process block 112 where the zoom factor is adjusted, either up or down, depending on the movement of knob 74 as determined in process block 108.

Figure 7:
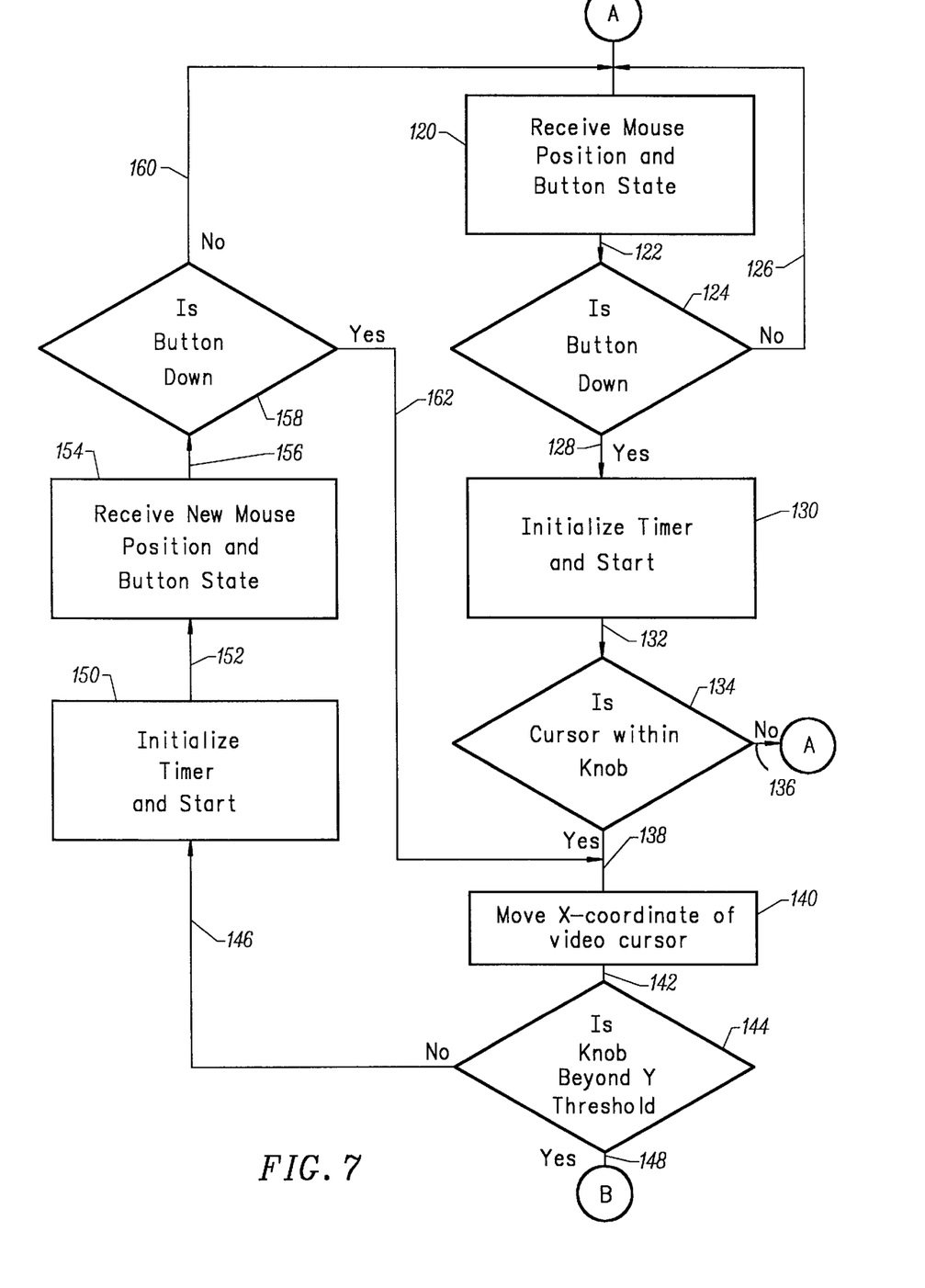
FIGS. 7, 8, 9 and 10 are detailed flow charts of the operation of the present invention.
Figure 8:
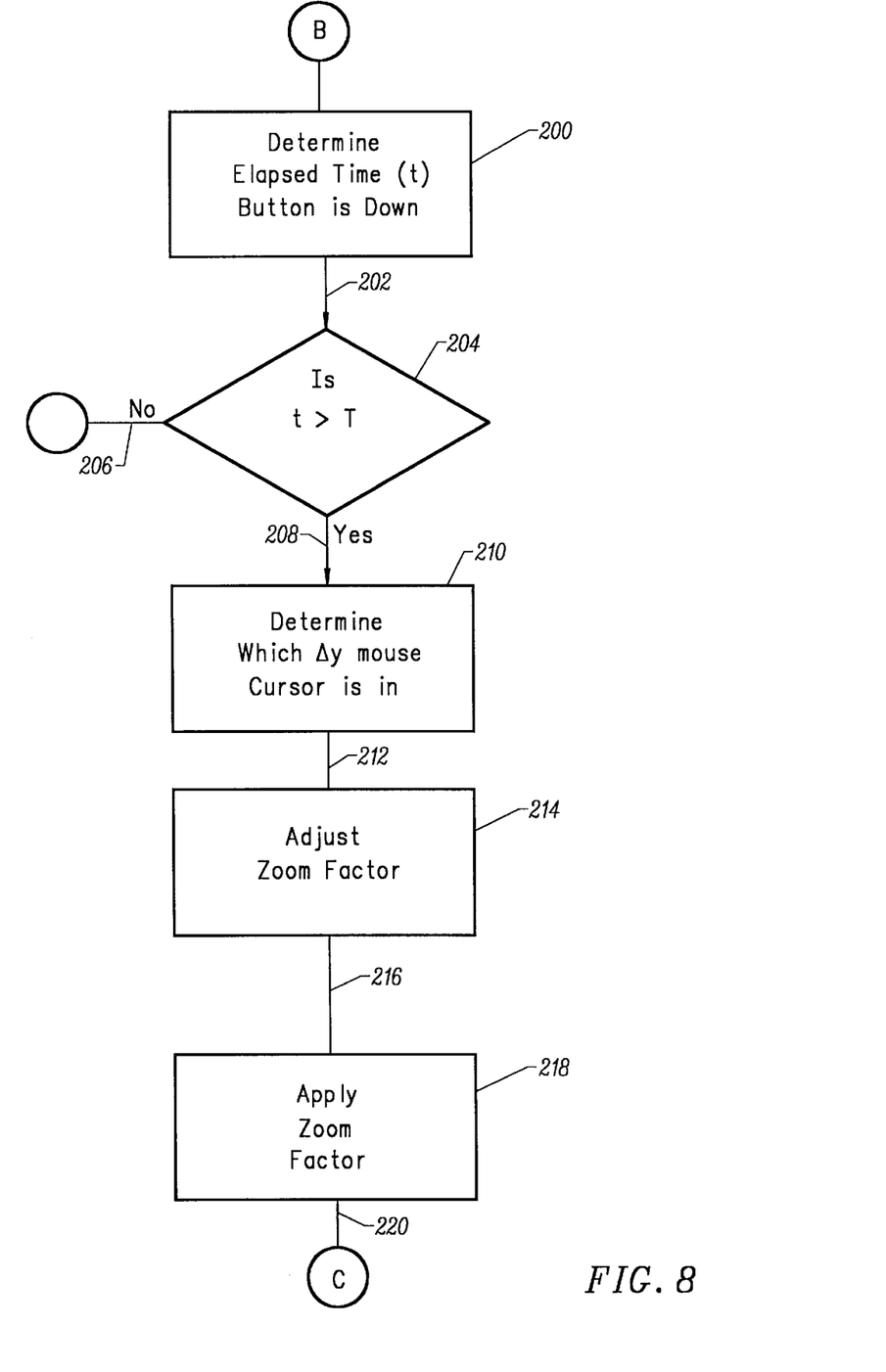
Figure 9:
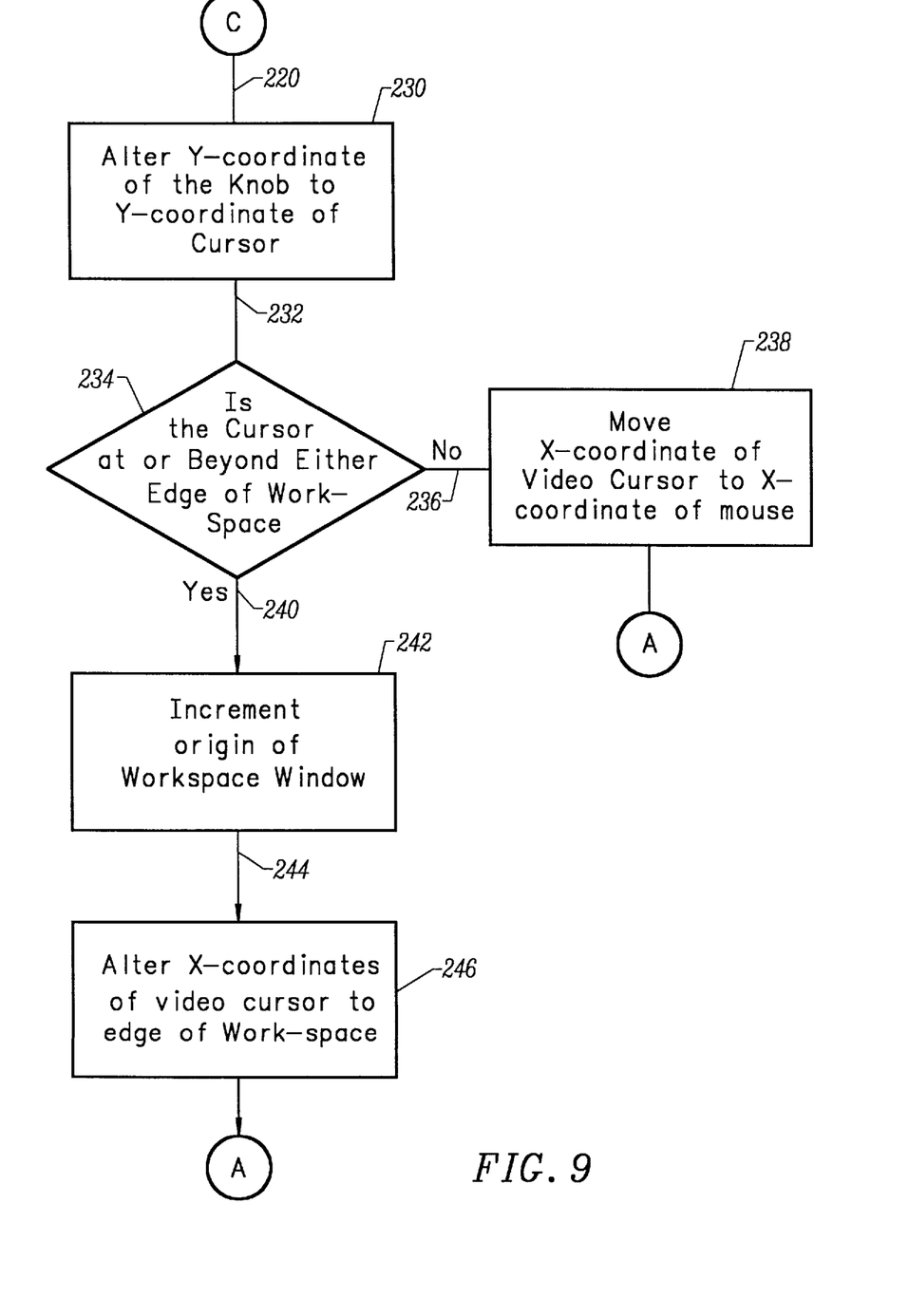

FIGS. 7, 8 and 9 are detailed flow charts illustrating the method of the present invention. Referring now to FIG. 7, the method starts in process block 120 where the position of the mouse cursor is received and the state of the mouse button. After receipt of this information follow process path 122 to decision block 124 and determine if the mouse button is down. If no, follow process path 126 to the beginning of the method. If yes, follow process path 128 to process block 130 where a dwell timer is initialized and started. The dwell timer thus keeps track of how long the mouse button is depressed and is part of a mechanism to eliminate the effects of unintentional movement of knob 74 in the vertical direction by the user. After starting the timer in process block 130 follow process path 132 to decision block 134 and determine if the mouse cursor is in knob 74 of the video cursor. If no, follow process path 136 back to the beginning. If yes, follow process path 138 to process block 140 and adjust the horizontal or x-coordinate of the video cursor to the new value received in process block 120. This moves the video cursor in the horizontal direction only. From process block 140, follow process path 142 to decision block 144 and determine if the mouse cursor has attempted to move knob 74 beyond a vertical threshold distance, Y. The threshold distance parameter, Y, is inserted in the method to provide a second mechanism for eliminating the effects of unintentional movement of knob 74 in the vertical direction. It creates a damping effect on the adjustment of the zoom factor and thereby eliminates unintended moves. Y may be set by the user. If the decision in block 144 is no, the attempted movement of knob 74 was less than threshold, Y, and follow process path 146 to process block 150 where the timer is initialized to zero and started again. This is done because if movement is in the horizontal direction only, the lack or a reset would soon cause t to exceed T and thus be ineffective From process block 150, follow process path 152 to process block 154 and receive new mouse position and button state. Then follow process path 156 to decision block and determine if the mouse button is still depressed. If no, return to the beginning of the method. If the mouse button is still down, follow process path 162 back to decision block 140 and determine if the most recent position of the mouse cursor has attempted to move knob 74 beyond the threshold distance, Y. If no repeat the foregoing steps. If yes, follow process path 142 to process-block 200 in FIG. 8.

Referring now to FIG. 8, in process block the elapsed time of the timer is determined. From process block 200 follow process path 202 to decision block 204 and determine if the elapsed time, t, is greater than a threshold value, T. If no, follow process path 206 back to the beginning. If yes, follow process path 208 to process block 210. In process block 200, determine in which Δy the mouse cursor is located as illustrated in FIG. 5. From process block 210 follow process path 212 to process block 214 where the zoom factor, F, is adjusted as called for by the determination of the Δy as illustrated in Table 1 preceding. This step loads a register with the current zoom factor. From process block 214, follow process path 216 to process block 218 and receive the asynchronous timer indication. From process block 218, and apply the new zoom factor. From process block 218, follow process path 220 to process block 230 in FIG. 9.

Referring now to FIG. 9, at process block 230, the y-coordinate of knob 74 is altered to the y-coordinate of the mouse cursor. This has the effect of moving knob 74 on the video display. From process block 230, follow process path 232 to decision block 234 and determine if the video cursor is within a threshold distance, D, of either origin 65 of workspace window 30 or at the horizontal limit of workspace window 30. D is a function of the zoom factor, F, associated with the Δy position of knob 74. If no, follow process path 236 to process block 238 where the x-coordinate of the video cursor is adjusted to the x-coordinate of the mouse.

If yes, follow process path 240 to process block 202 and increment the origin of workspace window 30 to accommodate the movement in the horizontal direction required by the change in zoom factor, F. this has the effect of having the contents of workspace window 30 scroll by in the horizontal direction. From process block 242, follow process path 244 to process block 246 where the x-coordinate of the video cursor is adjusted to the x-coordinate of the edge of the workspace. From process block 246 return to the beginning.

Figure 10:
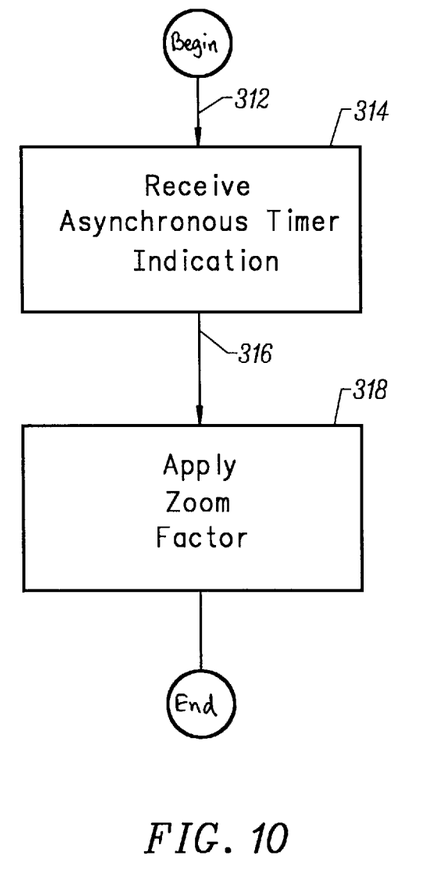

FIG. 10 is the flow chart of a separate routine required for proper operation of the invention. Referring now to FIG. 10, the method receives an asynchronous timer signal, or indication periodically, for example every 10 milliseconds at process block 314. At process block 318, upon receipt of the timing indication, the zoom factor, F, is applied. This small routine causes the zoom factor to be changed even though the mouse button has not been released.

It will be appreciated that the preferred embodiment of the invention as described above is subject to numerous adaptations and modifications without departing from the scope of the invention. Therefore, it is to be understood that, within the scope of the appended claims, the invention may be practiced other than as specifically described.

What is claimed is:

1. In a computer system having a CPU, memory and a video display and wherein video data is stored in said memory and wherein clips of said video data consisting of sequences of video frames are represented by blocks in a workspace on said video display, and wherein a video cursor is provided to scroll through said frames, the method including the following steps:

determining if said video cursor is being intentionally moved vertically by a user;

determining the vertical distance that said video cursor is moved from a reference point; and adjusting the scale of the horizontal axis of said workspace in relationship to the vertical movement of said video cursor so that the number of video frames that may be represented on said workspace varies accordingly.

* * * * *